United States Patent Office 3,049,940
Patented Aug. 21, 1962

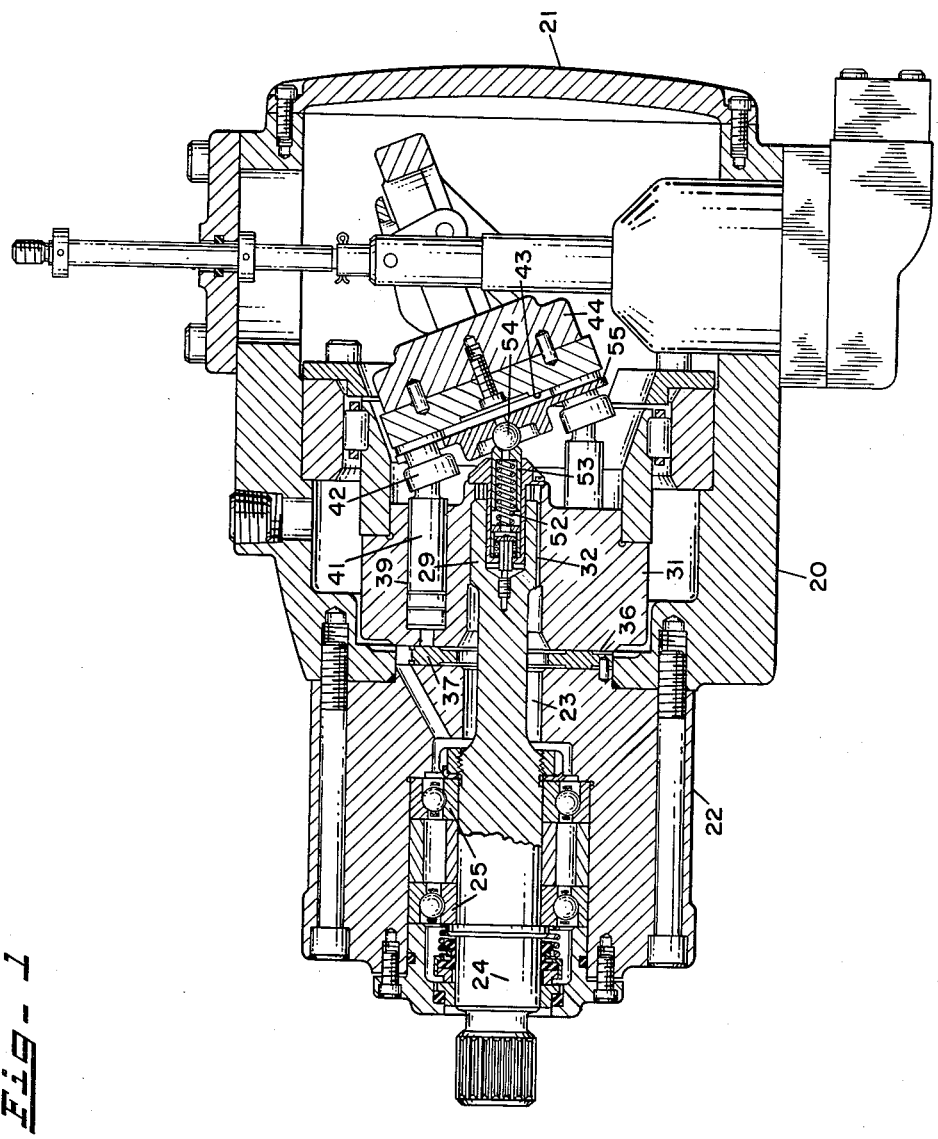

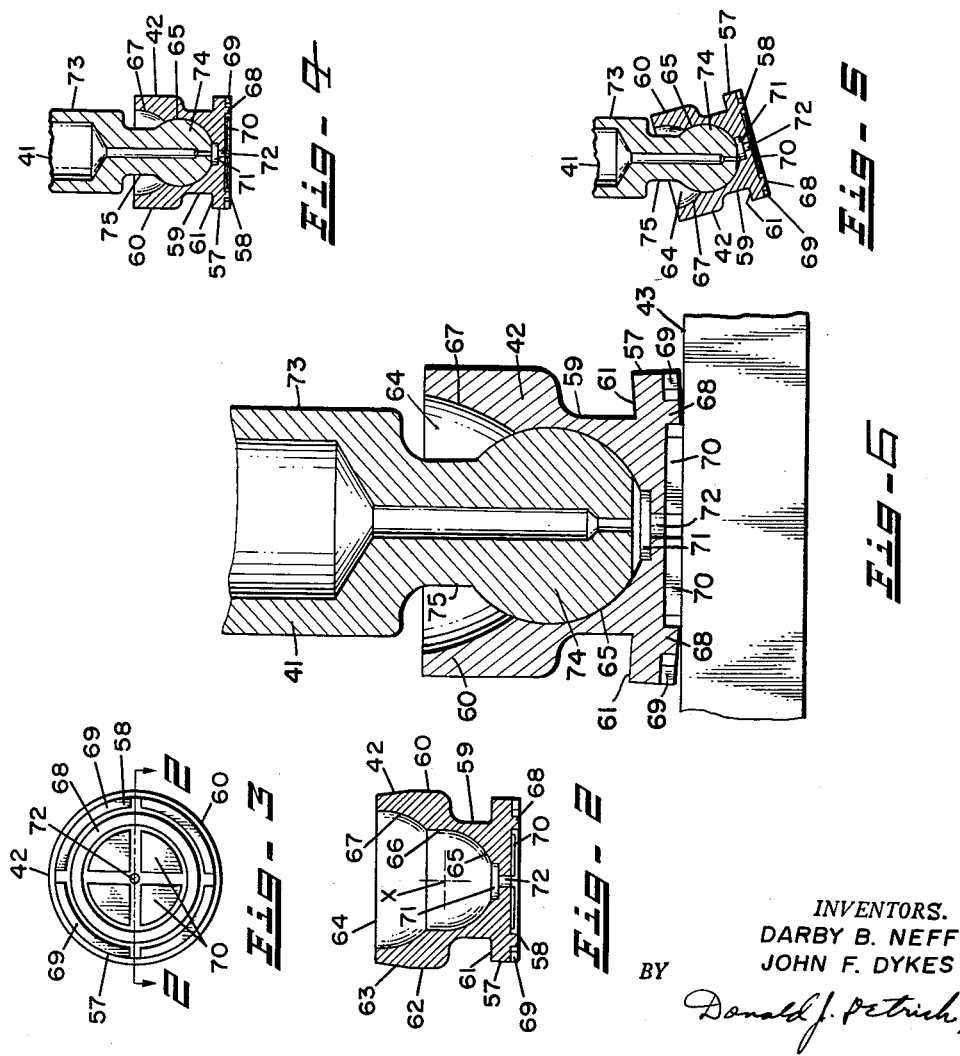

3,049,940
BALANCED PISTON SHOE
Darby B. Neff, Worthington, and John F. Dykes, Columbus, Ohio, assignors to American Brake Shoe Company, New York, N.Y., a corporation of Delaware
Continuation of application Ser. No. 658,165, May 9, 1957. This application Feb. 8, 1961, Ser. No. 87,977
11 Claims. (Cl. 74—569)

Our invention relates generally to fluid pressure energy translating devices and more particularly to improved construction in a piston shoe for use therein.

This application is a continuation of our copending application Serial No. 658,165, filed May 9, 1957, and now abandoned, entitled "Balanced Piston Shoe."

An object of the invention is to provide construction in a piston shoe whereby the shoe, after attachment to a piston through a ball and socket joint, is substantially balanced about the origin of the radii of the ball and socket joint.

Another object of the invention is to provide construction in a piston shoe of the type mentioned above wherein the shoe includes a skirt portion which is swageable about a ball of a ball and socket joint for permanently attaching the shoe to said ball and which skirt has the further function of cooperating in substantially balancing the shoe about the origin of the radii of said ball and socket joint.

Another object of the invention is to provide improved construction in a piston shoe of the type mentioned above wherein the shoe includes a sole portion having a cam engaging face grooved to form an endless sealing land which surrounds deflection pads and is preferably, but not necessarily, surrounded by wear pads and wherein the endless sealing land and wear pads have cam engaging surfaces which lie on one plane and the deflection pads have cam engaging surfaces which lie on a second plane which extends parallel to and is spaced from the first plane and passes through the sealing land and wear pads whereby the shoe, when operating in a fluid energy translating device, may bend, deflect or yield until said deflection pads just engage or kiss the cam surface over which they travel when the device is operating at its rated hydraulic pressures and whereby should the device be operated at hydraulic pressures greater than its rated pressure, said deflection pads will prevent further deflections of the piston shoe.

Further objects and advantages of the present invention will be apparent from the following description, reference being had to the accompanying drawings wherein a preferred form or embodiment of the invention is clearly shown.

In the accompanying drawings:

FIGURE 1 is a view in section of a hydraulic pump of an axial piston variable volume type including piston shoes made in accordance with this invention;

FIGURE 2 is a view in section of one of the piston shoes of the pump seen in FIGURE 1, the section being taken on line 2—2 of FIGURE 3;

FIGURE 3 is a view looking at the swash or cam plate engaging surface of the sole portion of the piston shoe seen in FIGURE 2;

FIGURE 4 is a view in section showing the piston and piston shoe assembly;

FIGURE 5 is a view similar to FIGURE 4 but showing the piston and piston shoe in different relative positions; and FIGURE 6 is a view on a larger scale showing a fragment of a piston, a piston shoe and a fragment of a swash plate of a pump or motor, the piston shoe being shown as it might appear when its sole is deflected by a heavy load applied through it.

The particular pump seen in FIGURE 1 of the drawings is employed only for the purpose of illustrating an environment wherein the product of the present invention may be used, and it is to be understood that the product of the invention may be employed in any other piston type fluid pressure energy translating device.

The pump shown in FIGURE 1 of the drawings is of the axial piston type, that is, the axis of its pumping pistons extend parallel to the axis of its shaft, and it is of the reversible variable volume type. It includes a housing or casing formed of a main hollow section 20 closed at one end by a cap 21 and at the other end by a bearing block 22 provided with a central bore 23 through which a shaft 24 extends. Shaft 24 is carried for rotation upon its axis by a pair of spaced anti-friction bearings 25. The other end 29 of shaft 24 is connected to a cylinder barrel 31 by a splined joint 32 whereby relative axial movement between the cylinder barrel 31 and shaft 24 is permitted and whereby some nutating or universal motion may occur between the shaft 24 and cylinder barrel 31.

The cylinder barrel 31 is carried or supported for rotation by an anti-friction bearing. The left end of the cylinder barrel 31 is faced to form a flat port plate engaging surface 36 which engages a flat ring-like port plate 37.

The cylinder barrel includes a plurality of cylinder bores 39 spaced equal distances apart on a circle the radius of which originates on the axis of the barrel 31 and each of these cylinders 39 communicates with a port in the port plate engaging surface 36 of cylinder barrel 31.

There is a hollow piston 41 in each of the cylinders 39 which has a piston shoe 42 permanently attached thereto for nutating or universal motion or movement about a ball and socket joint and these piston shoes 42 engage a flat face 43 of a cam or swash plate assembly 44 which is mounted on a pair of trunnions, not shown, for pivotal swinging movement on an axis extending at right angles to and intersecting the axis of the barrel.

The cylinder barrel 31 is held in sealing engagement with the port plate 37 and the piston shoes 42 are held in sealing engagement with the cam or swash plate surface 43 at all times.

In the pump shown, a spring 52 abuts a piston 53 which acts through a ball 54 to urge a piston hold-down plate 55 and the piston shoes 42 which are received in notches in the latter toward the cam or swash plate surface 43.

In the operation of the pump, the cylinder barrel 31, pistons 41 and the piston shoes 42 revolve bodily around the axis of the cylinder barrel 31 while the pistons 41 reciprocate in the cylinders 39 with a stroke the length of which is determined by the angular position of the cam or swash plate surface 43. As these elements rotate, the piston shoes 42 may also spin on the pistons 41.

We have found that in devices of the type described the upper limit of the speed at which the device may be driven safely is limited if piston shoes made in accordance with the teachings of the prior art are used in the device and that this is due to the fact that the centers of gravity of the prior art piston shoes are improperly located whereby centrifugal forces are caused to act upon the piston shoes causing the shoes to tilt or tip with respect to the cam or swash plate surface 43 resulting in a separation of the sole surfaces of the piston shoes from the cam or swash plate surface and not infrequently the destruction of the piston shoes, hold-down plate 55, pistons 41, cylinder barrel 31, etc.

We have found further that if the centers of gravity of the piston shoes are located on or substantially on the centers or origins of the radii of the spherical elements of the ball and socket connections by which the piston shoes are attached to the pistons whereby the piston shoes are substantially balanced dynamically and statically about said centers or points of origin, centrifugal forces acting upon the piston shoes to cause them to tip or tilt will be nonexistant or will be reduced to such degree that they may be ignored as a factor limiting the uppermost rate of speed at which any device in which they are employed may be operated.

In accordance with our findings, we have devised an improved one-piece piston shoe 42 which is best seen in FIGURES 2 and 3 of the drawings. The piston shoe 42 is preferably formed of a swageable resilient high strength bronze and includes a cylindrical base or sole portion 57 having a flat end, face or sole surface 58 adapted to engage and slide over the flat cam or swash plate surface 43 of the pump. It also includes a cylindrical neck portion 59 the axis of which coincides with the axis of said sole portion 57 and intersects the plane of the flat sole surface 58 at right angles. The neck portion 59 extends between the sole portion 57 and a skirt portion 60 to provide a circular shoulder 61 on the former which neck and shoulder are engaged by the hold-down plate 55 of the pump for the purposes indicated above. The skirt portion 60 includes a cylindrical section 62 adjacent the neck portion 59, the diameter of which is preferably made greater than the diameter of the sole portion 57, and a section 63 in the form of a frustum of a cone having its greatest diameter where it joins the cylindrical section 62 and tapering to a diameter which is also preferably greater than the diameter of the sole portion 57.

The piston shoe 42 also includes internal walls or surfaces which form a cavity 64 formed symmetrically about the axis of the piston shoe and which includes a hemispherical portion 65 the radius of which originates at a point X on the axis of the piston shoe and which point is substantially at the center of gravity of the piston shoe. The hemispherical portion 65 extends into or is contained substantially wholly within the neck portion 59 of the piston shoe and, as seen in FIGURE 2 of the drawings, its open upper end joins a short cylindrical portion including straight parallel walls 66 which extend upwardly and join a generally upwardly outwardly tapering cavity portion having arcuate walls 67.

The cam or swash plate engaging face or surface 58 of the sole portion 57 of the piston shoe is grooved to form an endless circular sealing land 68 (FIGURE 3) which is surrounded by four arcuate wear pads 69. Sealing land 68 surrounds four quadrants which form deflection pads 70. All of the wear pads 69 and the sealing land 68 lie on a first plane whereby they will engage the cam or swash plate surface 43 of the pump but the deflection pads 70 are faced off so that they lie on a second plane spaced slightly from the first plane and which extends through the sealing land and wear pads.

The cam engaging surfaces of the deflection pads 70 are recessed into the sole portion of the piston shoe to permit the shoe to deflect as the hydraulic pressure at which the device into which it is incorporated builds up to or falls below the rated operating pressure of the device and so that should the operating pressure of the device increase above its rated pressure further deflection of the piston shoe, or the sole portion thereof, will be prevented. In this manner, a better seal is obtained between the endless sealing land 68 and the cam plate surface 43 since the sealing land will be pressed upon the cam plate surface with slightly more force than the corresponding sealing land in a conventional piston shoe in which all of the cam plate engaging surfaces are finished to lie on a single plane.

The neck 59 of the piston shoe 42 also includes a recess 71 which is symmetrical about its axis and which opens to the bottom of the hemispherical portion 65 of the cavity 64 and is connected by a central bore or passage 72 with the grooves in the sole surface 58 which are surrounded by the sealing land 68 and lie between the deflection pads 70. This recess 71 and central bore or passage 72 have the well known function of conducting fluid under pressure derived through the piston to the pocket formed within the confines of the sealing land 68 and between the sole portion 57 and the cam or swash plate surface 43.

The particular pistons illustrated each include a cylindrical portion 73 (see FIGURES 4 and 5) which is received by and reciprocates in one of the cylinders 39 of the cylinder barrel 31 and a generally spherical or ball-like portion 74 connected to the cylindrical portion 73 through a neck 75. The piston is also provided with a stepped bore for reducing its weight and for conducting fluid therethrough to the recess 71.

A new and improved method of permanently attaching a piston shoe in accordance with this invention to the ball element of a piston for nutating or universal movement is described and claimed in our divisional application Serial No. 731,958, filed April 30, 1958, for "Method of Connecting a Piston Shoe Permanently to a Piston."

It will be obvious from the foregoing that we have devised an improved one-piece piston shoe of swageable material, preferably high strength bronze, which is designed to have its center of gravity on or substantially on a point about which the shoe will spin while being required to oscillate and which point will rotate in or follow a circular path as the device in which the piston shoe is employed is operated and that this point is the origin of the radii of the arcuate or spherical surfaces of the ball and socket elements of the piston and piston shoe. It will also be seen that since the piston shoe is substantially balanced dynamically and statically about the above-mentioned point that centrifugal forces acting upon it when it is operating in a hydraulic fluid pressure energy translating device will have little or no tendency to cause it to tilt or tip with respect to the cam or swash plate of the apparatus and that therefore these centrifugal forces are, for practical purposes, not a factor limiting high speed operation of the device.

While the form of embodiment of the present invention as herein disclosed constitutes a preferred form, it is to be understood that other forms might be adopted, all coming within the scope of the claims which follow:

Having described our invention, we claim.

1. A piston shoe for use in a fluid pressure energy translating device including a circular sole portion having an end face grooved to form an endless sealing land surrounded by wear pads and surrounding deflection pad means, said endless sealing land and wear pads having cam engaging surfaces lying on one plane, and said deflection pad means having cam engaging surface means lying on a second plane, said second plane extending through said sealing land and wear pad means; a neck portion of smaller diameter than said sole portion cooperating therewith to form a circular shoulder and extending from said sole portion opposite said face on an axis lying at right angles to the latter; a swageable skirt portion of greater diameter than said sole portion extending axially from said neck portion; wall means in said neck and skirt portions forming a socket including a hemispherical portion in said neck portion, a cylindrical portion extending from said hemispherical portion and a portion flaring outwardly from said hemispherical portion, said hemispherical portion having its radius originating at a point on said axis, said piston shoe having its center of gravity substantially on said point whereby said piston shoe will be substantially balanced dynamically and statically; wall means forming a recess in said neck portion opening to said hemispherical surface, and passage means extending from said recess to said end face and within the confines of said sealing land.

2. A piston shoe for use in a fluid pressure energy translating device including a sole portion having a cam engaging end face grooved to form an endless sealing land surrounding deflection pad means, said endless sealing land having a cam engaging surface lying on one plane, and said deflection pad means having cam engaging surface means lying on a second plane, said second plane extending through said sealing land; a neck portion of smaller diameter than said sole portion cooperating therewith to form a circular shoulder and extending from said sole portion opposite said face on an axis lying at right angles to the latter; a swageable skirt portion of greater diameter than said sole portion extending axially from said neck portion; wall means in said neck and skirt portions forming a socket including a hemispherical portion in said neck portion, a cylindrical portion extending from said hemispherical portion and a portion flaring outwardly from said hemispherical portion, said hemispherical portion having its radius originating at a point on said axis, said piston shoe having its center of gravity substantially on said point whereby said piston shoe will be substantially balanced dynamically and statically; wall means forming a recess in said neck portion opening to said hemispherical surface, and passage means extending from said recess to said end face and within the confines of said sealing land.

3. A piston shoe for use in a fluid pressure energy translating device, said shoe having an axis and including a sole portion having a cam engaging end face grooved to form an endless sealing land surrounding deflection pad means, said endless sealing land having a cam engaging surface lying on one plane, said plane extendnig at right angles to said axis, and said deflection pad means having cam engaging surface means lying on a second plane, said second plane being parallel to said first plane and extending through said sealing land; a swageable skirt formed symmetrically about said axis; wall means in said piston shoe forming a socket including a hemispherical portion, a cylindrical portion extending from said hemispherical portion and a portion in said skirt flaring outwardly from said hemispherical portion, said hemispherical portion having its radius originating at a point on said axis, said piston shoe having its center of gravity substantially on said point whereby said piston shoe will be substantially balanced dynamically and statically; wall means forming a recess in said neck portion opening to said hemispherical surface, and passage mean extending from said recess to said end face and within the confines of said sealing land.

4. A piston shoe for use in a fluid pressure energy translating device, said shoe having an axis and including a sole portion having a cam engaging end face grooved to form an endless sealing land surrounding deflection pad means, said endless sealing land having a cam engaging surface lying on one plane, said plane extending at right angles to said axis, and said deflection pad means having cam engaging surface means lying on a second plane, said second plane being parallel to said first plane and extending through said sealing land; a swageable skirt formed symmetrically about said axis; wall means in said piston shoe forming a socket including a hemispherical portion, a cylindrical portion extending from said hemispherical portion and a portion in said skirt flaring outwardly from said hemispherical portion, said hemispherical portion having its radius originating at a point on said axis, said piston shoe having its center of gravity substantially on said point whereby said piston shoe will be substantially balanced dynamically and statically, and passage means extending from said hemispherical surface to said end face and within the confines of said sealing land.

5. A piston shoe for use in a fluid pressure energy translating device, said shoe having an axis and including a sole portion having a cam engaging end face grooved to form an endless sealing land surrounding deflection pad means, said endless sealing land having a cam engaging surface lying on one plane, said plane extending at right angles to said axis, and said deflection pad means having cam engaging surface means lying on a second plane, said second plane being parallel to said first plane and extending through said sealing land.

6. A piston shoe for use in a fluid pressure energy translating device including a portion forming a sole having an end face grooved to form a sealing land surrounding deflection pads, wear pads positioned radially outwardly of said sealing land, said sealing land and wear pads having surfaces lying in one plane, and said deflection pads having surfaces lying in a second plane, said second plane extending through said sealing land and wear pads.

7. A piston shoe for use in a fluid pressure energy translating device including a portion forming a sole having an end face grooved to form an endless sealing land surrounding deflection pads, said endless sealing land having a surface lying in one plane, and said deflection pads having surfaces lying in a second plane, said second plane extending through said sealing land.

8. A piston shoe for use in a fluid pressure energy translating device including a portion forming a circular sole; a neck portion cooperating therewith to form a shoulder and extending from said sole portion on an axis lying at right angles thereto; a swageable skirt portion extending axially from said neck portion; and wall means in said neck and skirt portions forming a socket having side portions in said skirt portion joining a convex portion in said neck the radius of which originates from a point on said axis, said piston shoe having its center of gravity substantially upon said point whereby said piston shoe will be substantially balanced dynamically and statically.

9. In a piston shoe adapted to operate in conjunction with a piston in a rotary piston type fluid pressure energy translating device wherein the axis of said piston lies at an angle of less than ninety degrees to the axis of rotation of the main shaft of the fluid energy translating device and said piston axis rotates around said main shaft during the operation of said fluid energy translating device, that improvement which consists of means on the piston shoe through which it engages said piston for nutating motion, said means having a surface through which it is connected with said piston, said surface originating from a center which is substantially upon the center of gravity of the piston shoe whereby centrifugal forces tending to cause nutation of the shoe are substantially balanced.

10. In a piston shoe adapted to operate in conjunction with a piston in a rotary piston type fluid pressure energy translating device wherein the axis of said piston rotates around the main shaft of said fluid pressure energy translating device during its operation, that improvement which comprises, socket means provided by the piston shoe, said socket means receiving cooperating ball means on said piston thereby connecting said piston shoe to said piston for nutating motion relative thereto, said socket means having a center of generation which substantially coincides with the center of gravity of said shoe.

11. In a piston shoe adapted to operate in conjunction with a piston in a rotary piston type fluid pressure energy translating device wherein the axis of said piston rotates around the main shaft of said fluid pressure energy translating device during its operation, that improvement which comprises, a ball at one end of said piston, axially symmetric socket means provided by said shoe gripping said ball thereby connecting said shoe to said piston for nutating motion thereabout, said socket means presenting a hemispherical surface at the inner end thereof adapted to facially engage the adjacent surface of said ball, the center of generation of said hemispherical surface and the center of gravity of said shoe substantially coinciding with each other and lying on the axis of said shoe.

References Cited in the file of this patent

UNITED STATES PATENTS

| | | |
|---|---|---|
| 2,141,935 | Rose | Dec. 27, 1938 |
| 2,642,809 | Born et al. | June 23, 1953 |
| 2,737,899 | Bonnette et al. | Mar. 13, 1956 |
| 2,776,627 | Keel | Jan. 8, 1957 |
| 2,776,628 | Keel | Jan. 8, 1957 |